United States Patent
Sauvageot et al.

(10) Patent No.: US 12,528,955 B2
(45) Date of Patent: Jan. 20, 2026

(54) RADIATION CURABLE INKJET INKS

(71) Applicant: Agfa-Gevaert NV, Mortsel (BE)

(72) Inventors: Marion Sauvageot, Mortsel (BE); Johan Loccufier, Mortsel (BE); Mitch Matthys, Mortsel (BE)

(73) Assignee: Agfa-Gevaert NV, Mortsel (BE)

( * ) Notice: Subject to any disclaimer, the term of this patent is extended or adjusted under 35 U.S.C. 154(b) by 197 days.

(21) Appl. No.: 18/262,623

(22) PCT Filed: Jan. 21, 2022

(86) PCT No.: PCT/EP2022/051317
§ 371 (c)(1),
(2) Date: Jul. 24, 2023

(87) PCT Pub. No.: WO2022/157293
PCT Pub. Date: Jul. 28, 2022

(65) Prior Publication Data
US 2024/0093046 A1    Mar. 21, 2024

(30) Foreign Application Priority Data
Jan. 25, 2021   (EP) .................................... 21153139

(51) Int. Cl.
*C09D 11/101*   (2014.01)
*B41J 2/01*   (2006.01)
(Continued)

(52) U.S. Cl.
CPC ............... *C09D 11/101* (2013.01); *B41J 2/01* (2013.01); *B41J 2/2107* (2013.01); *B41J 11/002* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38;
(Continued)

(56) References Cited

U.S. PATENT DOCUMENTS 5,057,245 A    10/1991  Frentzel et al.
2007/0049650 A1*  3/2007  Araki .................... C09B 29/363
                                                                    522/6
(Continued)

FOREIGN PATENT DOCUMENTS

EP    1624001 A1    2/2006
EP    3533844 A1    9/2019
(Continued)

OTHER PUBLICATIONS

European Patent Office, International Search Report in International Patent Application No. PCT/EP2022/051317, mailed May 2, 2022, 4 pp.
European Patent Office, Written Opinion in International Patent Application No. PCT/EP2022/051317, mailed May 2, 2022, 6 pp.

* cited by examiner

*Primary Examiner* — Manish S Shah
(74) *Attorney, Agent, or Firm* — Leydig, Voit & Mayer, Ltd.

(57) ABSTRACT

A radiation curable inkjet ink comprising a polymerizable compound, a phenolic resin and a thermal cross-linking agent, characterized in that the phenolic resin includes at least one structural moiety according to Formula I, Formula I wherein L represents a divalent linking group having no more than 10 carbon atoms; n represents 0 or 1; R1 and R2 independently from each other represent a group selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, a substituted or unsubstituted (hetero)aryl group and a substituted or unsubstituted alkoxy group.

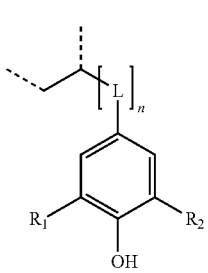

14 Claims, No Drawings

(51) Int. Cl.
*B41J 2/21* (2006.01)
*B41J 11/00* (2006.01)
*C09D 11/103* (2014.01)
*C09D 11/106* (2014.01)
*C09D 11/107* (2014.01)
*C09D 11/38* (2014.01)

(52) U.S. Cl.
CPC ......... *B41J 11/0021* (2021.01); *C09D 11/103* (2013.01); *C09D 11/106* (2013.01); *C09D 11/107* (2013.01); *C09D 11/38* (2013.01)

(58) Field of Classification Search
CPC ..... C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 2014/0055544 A1* | 2/2014 | Iraqi | C09D 11/101 522/81 |
| 2016/0002378 A1* | 1/2016 | Shimizu | C09D 153/00 525/330.3 |
| 2017/0240739 A1* | 8/2017 | Shimizu | C08L 53/00 |
| 2018/0329297 A1* | 11/2018 | Fukunaga | G03F 7/0382 |

FOREIGN PATENT DOCUMENTS

| | | |
|---|---|---|
| EP | 3656824 A1 | 5/2020 |
| JP | 2008-291177 A | 12/2008 |
| JP | 2009-506187 A | 2/2009 |
| JP | 2010-266518 A | 11/2010 |
| JP | 2014-098139 A | 5/2014 |
| JP | 2015-007674 A | 1/2015 |
| WO | WO 2007/026366 A1 | 3/2007 |
| WO | WO 2018/087056 A1 | 5/2018 |
| WO | WO 2020/109132 A1 | 6/2020 |
| WO | WO 2020/109769 A1 | 6/2020 |
| WO | WO 2021/089358 A1 | 5/2021 |

RADIATION CURABLE INKJET INKS

CROSS-REFERENCE TO RELATED APPLICATIONS

This patent application is the U.S. national stage of copending International Patent Application No. PCT/EP2022/051317, filed Jan. 21, 2022, which claims the benefit of European Patent Application No. 21153139.7, filed Jan. 25, 2021.

TECHNICAL FIELD OF THE INVENTION

The present invention relates to a method of manufacturing Printed Circuit Boards including an inkjet printing step and to inkjet inks used therein.

BACKGROUND ART FOR THE INVENTION

The production workflow of printed circuit boards (PCBs) is gradually shifting from the standard workflow towards a digital workflow to reduce the amount of process steps and lowering the cost and the environmental impact, especially for short run productions.

Inkjet printing is a preferred digital manufacturing technology for different steps of the PCB manufacturing process, going from etch resist over solder mask to legend printing. Preferred inkjet inks are UV curable inkjet inks.

In the different production steps of PCBs, adhesion of the inkjet inks towards various substrates is of crucial importance. When the radiation curable inkjet ink is used to produce a solder mask, the adhesion of the cured inkjet ink on several substrates has to survive the severe conditions used during soldering (solder resistance) and ENIG plating (ENIG plating resistance). Especially the ENIG plating process wherein severe and varying conditions (pH and temperature) are used is very demanding as regard to the adhesion requirements of the inkjet ink.

To improve the adhesion, so-called adhesion promoters have been added to the inkjet inks. For example in WO2004/026977 and WO2004/105 (Avecia) (meth)acrylate functional monomers containing one or more acid groups, such as (meth)acrylated carboxylic acids, (meth)acrylated phosphoric acid esters and (meth)acrylated sulphonic acids have been proposed to improve the adhesion.

WO2018/087056 (Agfa Gevaert/Electra Polymers) discloses a combination of an adhesion promoter with a compounds including at least two phenolic groups.

The presence of adhesion promoters, for example the acid containing compounds referred to above, may result in a poor stability of the inkjet ink.

EP-A 1624001 (Taiyo Ink Manufacturing) discloses a solder mask inkjet ink comprising a (meth)acrylate monomer including a thermosetting functional group.

WO2020/109769 (Electra Polymers) discloses a solder mask inkjet ink comprising a reactive monomer, oligomer of prepolymer containing at least one epoxy or oxetane functional group, a free radical polymerizable compound, a thermal cross-linking agent and a radical initiator.

However, there is still a need for inkjet inks that can be used in a PCB manufacturing process having an improved solder and ENIG plating resistance and having a sufficient ink stability.

SUMMARY OF THE INVENTION

It is an object of the invention to provide a radiation curable inkjet ink for manufacturing a printed circuit board (PCB) including an inkjet printing step to prepare a solder mask wherein the solder mask has an improved solder and ENIG resistance.

The object of the invention is realized by the radiation curable inkjet ink as defined in claim 1.

Further objects of the invention will become apparent from the description hereinafter.

DETAILED DESCRIPTION OF THE INVENTION

Definitions

The term "monofunctional" in e.g. monofunctional polymerizable compound means that the polymerizable compound includes one polymerizable group.

The term "difunctional" in e.g. difunctional polymerizable compound means that the polymerizable compound includes two polymerizable groups.

The term "polyfunctional" in e.g. polyfunctional polymerizable compound means that the polymerizable compound includes more than two polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted alkaryl group is preferably a phenyl or naphthyl group including one, two, three or more $C_1$ to $C_6$-alkyl groups.

Unless otherwise specified a substituted or unsubstituted aralkyl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, amine, ether, thioether, ketone, aldehyde, sulfoxide, sulfone, sulfonate ester, sulphonamide, —Cl, —Br, —I, —OH, —SH, —CN and —$NO_2$.

Radiation Curable Inkjet Ink

The radiation curable inkjet ink according to the invention includes at least a phenolic resin as described below and a thermal cross-linking agent.

The radiation curable inkjet ink may be cured with any type of radiation but is preferably cured with UV radiation, more preferably with UV radiation from UV LEDs. The radiation curable inkjet ink is thus preferably a UV curable inkjet ink.

For reliable industrial inkjet printing, the viscosity of the radiation curable inkjet ink is preferably no more than 20 mPa·s at 45° C., more preferably between 1 and 18 mPa·s at 45° C., and most preferably between 4 and 14 mPa·s at 45° C., all at a shear rate of 1000 s$^{-1}$.

A preferred jetting temperature is between 10 and 70° C., more preferably between 20 and 55° C., and most preferably between 25 and 50° C.

For good image quality and adhesion, the surface tension of the radiation curable inkjet ink is preferably in the range of 18 to 70 mN/m at 25° C., more preferably in the range of 20 to 40 mN/m at 25° C.

Phenolic Resins

The phenolic resin according to the present invention includes a phenolic group functionalized polymer.

The phenolic resin is preferably a phenolic group functionalized polyacrylate, polymethacrylate or polystyrene.

A particular preferred phenolic resin includes 4-hydroxystyrene based polymers where the 4-hydroxystyrene moiety is further functionalized with phenolic group containing functional groups.

The phenolic resin preferably comprises at least one structural moiety according to Formula I,

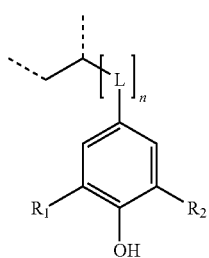

Formula I wherein

L represents a divalent linking group having no more than 10 carbon atoms;

n represent 0 or 1;

$R_1$ and $R_2$ independently represent a group selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, a substituted or unsubstituted (hetero)aryl group and a substituted or unsubstituted alkoxy group.

The phenolic resin preferably has a polystyrene backbone.

Preferably, $R_1$ and $R_2$ independently represent a hydrogen, a substituted or unsubstituted alkyl group or a substituted or unsubstituted aralkyl group.

More preferably, at least one of $R_1$ and $R_2$ is further substituted by a substituent comprising an additional phenolic group.

According the another preferred embodiment, the phenolic resin preferably comprises at least one structural moiety according to Formula II,

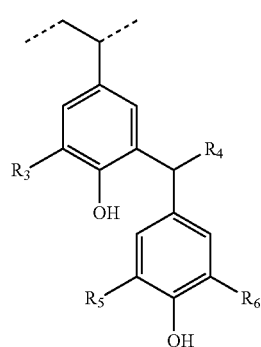

Formula II wherein $R_3$, $R_5$ and $R_6$ independently represent a group selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, a substituted or unsubstituted (hetero)aryl group and a substituted or unsubstituted alkoxy group;

$R_4$ represents a group selected from the group consisting of a hydrogen, an alkyl group and an aryl group.

Preferably, at least one of $R_3$, $R_5$ and $R_6$ is further substituted by a substituent comprising an additional phenolic group.

$R_4$ is preferably a hydrogen or a $C_1$ to $C_6$ alkyl group, more preferably a methyl group.

The phenolic resin comprising a structural moiety according to Formula I or Formula II may be a co-polymer derivative but is preferably a further functionalized homopolymer, more preferably a functionalized poly(4-hydroxystyrene).

In a particular preferred embodiment, the phenolic resin comprising a structural moiety according to Formula I or Formula II has a branched or hyperbranched structure.

Particularly preferred phenolic resins according to the present invention are disclosed in US20060099531 (DuPont Electronic Polymers L.P.), in particular the phenolic resins having structures I, II, III and IV disclosed in paragraph 0018.

The phenolic resins according to the present invention do not include so-called phenol-formaldehyde resins, such as novolac or resole type resins.

Such phenol-formaldehyde resins are prepared by the reaction of phenol or substituted phenol with formaldehyde. A difference with the phenolic resins according to the present invention lies in the fact that for phenol-formaldehyde resins the phenol or substituted phenol groups are separated from each other by a methylene group. In other words, the phenol or substituted phenol groups are part of a polymer backbone, as depicted in the structure shown below.

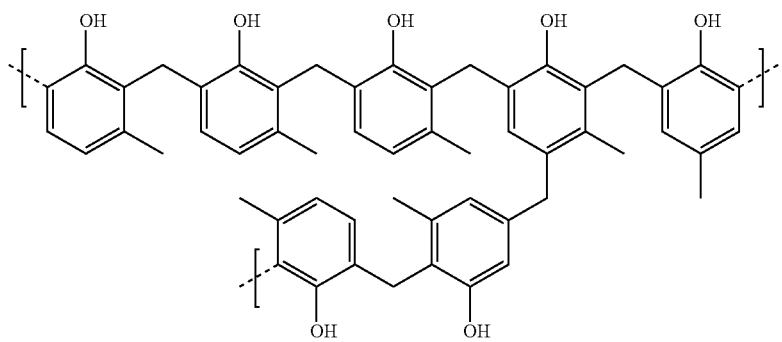

In the phenolic resin according to the present invention, the substituted or unsubstituted phenolic groups are attached to a polymer backbone as depicted below.

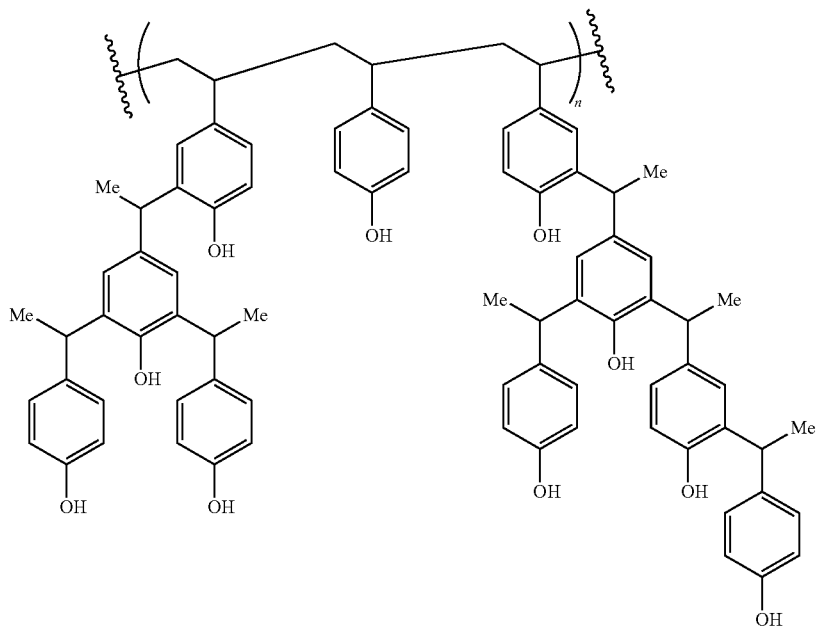

While the phenol groups in a phenol formaldehyde resin are separated by a methylene group (1 C atom), at least some phenol groups are separated by at least 3 C atoms in the phenolic resin according to the present invention.

The amount of the phenolic resin is preferably from 0.5 to 20 wt %, more preferably from 1 to 15 wt %, most preferably from 2.5 to 10 wt %, all relative to the total weight of the inkjet ink.

Thermal Cross-Linking Agents

Any thermal cross-linking agent may be used.

The thermal crosslinking agent may have different degrees of functionality.

The inkjet ink may comprise a mixture of different thermal cross-linking agents.

Preferred thermal cross-linking agents are an isocyanate compound or a triazine compound.

The isocyanate compound is preferably an aliphatic/alicyclic isocyanate or an aromatic isocyanates.

Examples of aliphatic/alicyclic isocyanates include 1,6-hexamethylene diisocyanate (HDI or HMDI), isophorone diisocyanate (IPDI), methylcyclohexane 2,4-(2,6)-diisocyanate (hydrogenated TDI), 4,4'-methylenebis(cyclohexylisocyanate) (hydrogenated MDI), 1,3-(isocyanatomethyl)cyclohexane (hydrogenated XDI), norbornene diisocyanate (NDI), lysine diisocyanate (LDI), trimethyl-hexamethylene diisocyanate and (TMDI), dimer acid diisocyanate (DDI), N,N',N"-tris(6-isocyanate-hexamethylene)biuret, HDI trimer, HDI uretdione and IPDI trimer.

Examples of aromatic isocyanates include toluene diisocyanate (TDI), 4,4'-di-phenyl-methanediisocyanate (MDI) and xylylene diisocyanate (XDI).

The isocyanate compound may be blocked or unblocked, preferably blocked.

A blocking agent used to form a blocked isocyanate is a protective group, which is removed at elevated temperature, for example during a thermal curing process. Using a blocked isocyanate typically improves the storage stability of the inkjet ink.

Examples of the blocking agent include alcohols such as ethanol, n-propanol, isopropanol, t-butanol, and isobutanol; phenols such as phenol, chlorophenol, cresol, xylenol, and p-nitrophenol; alkylphenols such as p-t-butylphenol, p-sec-butylphenol, p-sec-amylphenol, p-octylphenol, and p-nonylphenol; basic nitrogen-containing compounds such as 3-hydroxypyridine, S-hydroxyquinoline, and 8-hydroxyquinaldine; active methylene compounds such as diethyl malonate, ethyl acetoacetate, and acetylacetone; acid amides such as acetamide, acrylamide, and acetanilide; acid imides such as succinimide and maleic imide; imidazoles such as 2-ethylimidazole and 2-ethyl-4-methylimidazole; pyrazoles such as pyrazole, 3-methylpyrazole, and 3,5-dimethylpyrazole; lactams such as 2-pyrrolidone and 8-caprolactam; oximes of ketone or aldehyde, such as acetoxime, methyl ethyl ketone oxime, cyclohexanone oxime, and acetaldoxime; ethyleneimine; and bisulfite. Hindered secondary amines may be used as blocking agents for toxicology reasons. Preferred hindered secondary amines are selected form the group consisting of ethyl-tert.butyl amine, diisopropyl amine, 2,6-dimethyl-piperidine, ethyl-isopropyl amine, di-tert.butyl amine and diisobutyl amine.

A particular preferred isocyanate compound is a HDI biuret blocked with 3,5-dimethylpyrazole, commercially available from Baxenden Chemicals Ltd as Trixene BI 7960.

Any triazine compound having thermal cross-linking properties may be used.

A preferred triazine compound has a chemical structure according to Formula III,

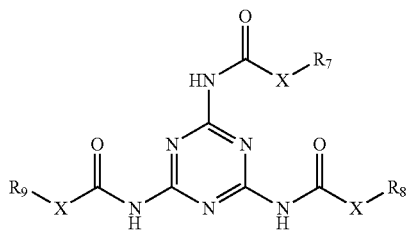

Formula III wherein

X represents N, O, S, P or C;

$R_7$, $R_8$ and $R_9$ independently from each other represent a substituted or unsubstituted alkyl group.

X preferably represents O or C, most preferably O.

Preferably, $R_7$, $R_8$ and $R_9$ independently from each other represent a substituted or unsubstituted $C_1$-$C_8$ alkyl group. More preferably, $R_7$, $R_8$ and $R_9$ independently from each other represent a group selected from the group consisting of methyl, ethyl, n-propyl, i-propyl, butyl, n-octyl, 2-ethyl hexyl.

Preferred triazine compounds according to Formula III and their preparation method are disclosed in U.S. Pat. No. 5,084,541 (American Cyanamid Company).

Preferred triazine compounds according to Formula III are commercially available from Allnex under the name Cymel® NF 2000 and from BASF under the name Larotact® 150.

The inkjet ink according to the present invention preferably includes a blocked isocyanate compound or a triazine compound according to Formula III.

More preferably, the inkjet ink includes both a blocked isocyanate and a triazine compound according Formula III.

The total amount of thermal cross-linking agents is preferably from 0.5 up to 10 wt % more preferably from 1 to 7.5 wt %, most preferably from 2.5 to 5 wt %, all relative to the total weight of the inkjet inks.

The amount of the isocyanate compound is preferably from 0.1 to 7.5 wt %, more preferably from 0.5 to 5 wt %, most preferably from 1 to 3 wt %, all relative to the total weight of the inkjet ink.

The amount of the triazine compound is preferably from 0.1 to 7.5 wt %, more preferably from 0.5 to 5 wt %, most preferably from 1 to 3 wt %, all relative to the total weight of the inkjet ink.

When both a triazine compound and an isocyanate compound is present in the inkjet ink, the amount of the triazine compound is preferably higher compared to the amount of the isocyanate compound. The ratio of the amount of the triazine compound to the amount of the isocyanate compound is preferably from 0.9 to 5, more preferably from 1.5 to 3.

It has been observed that the presence of thermal cross-linking agents improves various solder resist properties such as resistance to heat, hardness, resistance to soldering heat, resistance to chemicals, electrical insulating properties, and resistance to electroless plating and immersion plating.

Photoinitiators

The radiation curable inkjet ink preferably includes a photoinitiator, preferably a free radical photoinitiator.

A free radical photoinitiator is a chemical compound that initiates polymerization of monomers and oligomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical.

This second compound is called a polymerization synergist or co-initiator. Both type I and type II photoinitiators can be used in the present invention, alone or in combination.

Suitable photoinitiators are disclosed in CRIVELLO, J. V., et al. Photoinitiators for Free Radical, Cationic and Anionic Photopolymerization. 2nd edition. Edited by BRADLEY, G. London, UK: John Wiley and Sons Ltd, 1998. p. 276-293.

Specific examples of free radical photoinitiators may include, but are not limited to, the following compounds or combinations thereof: benzophenone and substituted benzophenones; 1-hydroxycyclohexyl phenyl ketone; thioxanthones such as isopropylthioxanthone; 2-hydroxy-2-methyl-1-phenylpropan-1-one; 2-benzyl-2-dimethylamino-(4-morpholinophenyl) butan-1-one; benzyl dimethylketal; 2-methyl-1-[4-(methylthio) phenyl]-2-morpholinopropan-1-one; 2,2-dimethoxy-1,2-diphenylethan-1-one or 5,7-diiodo-3-butoxy-6-fluorone.

A preferred photoinitiator is a thioxanthone compound, such as Darocur ITX, an isomeric mixture of 2- and 4-isopropylthioxanthone.

Another preferred photoinitiator is an acylphosphine oxide compound. The acylphosphine oxide compound may be selected from the group consisting of a mono-acylphosphine oxide and a di-acylphosphine oxide. Preferred acylphosphine oxide photoinitiators are diphenyl(2,4,6-trimethylbenzoyl)phosphine oxide (TPO), ethyl (2,4,6-trimethylbenzoyl) phenyl phosphinate (TPO-L), phenylbis(2,4,6-trimethylbenzoyl)phosphine oxide) (BAPO), bis(2,6-dimethyl-benzoyl)-2,4,4-trimethylpentylphosphine oxide and 2,4,6-trimethoxybenzoyl-diphenylphosphine oxide.

Other preferred photoinitiators are α-hydroxy-ketone Type I photoinitiators such as for example oligo[2-hydroxy-2-methyl-1-[4-(1-methylvinyl-phenyl]propanone] available as Esacure® KIP IT from IGM resins.

A preferred amount of photoinitiator is from 0.2 up to 20 wt %, more preferably from 0.5 up to 10 wt %, most preferably from 1 up to 8 wt %, particularly preferred from 1.5 up to 6 wt %, all relative to the total weight of the radiation curable inkjet ink.

In order to increase the photosensitivity further, the radiation curable inkjet ink may additionally contain co-initiators. Suitable examples of co-initiators can be categorized in three groups:
  (1) tertiary aliphatic amines such as methyldiethanolamine, dimethylethanolamine, triethanolamine, triethylamine and N-methylmorpholine;
  (2) aromatic amines such as amylparadimethyl-aminobenzoate, 2-n-butoxyethyl-4-(dimethylamino) benzoate, 2-(dimethylamino)-ethylbenzoate, ethyl-4-(dimethyl-amino)benzoate, and 2-ethylhexyl-4-(dimethylamino)benzoate; and
  (3) (meth)acrylated amines such as dialkylamino alkyl (meth)acrylates (e.g., diethyl-aminoethylacrylate) or N-morpholinoalkyl-(meth)acrylates (e.g., N-morpholinoethyl-acrylate).

Preferred co-initiators are aminobenzoates.

A preferred low molecular aminobenzoate is Genocure® EPD from RAHN.

Particularly preferred aminobenzoate co-initiators are selected from the group consisting of polymerisable, oligomeric and polymeric aminobenzoate co-initiators.

Polymerisable co-initiators are disclosed in EP-A 2033949 (Agfa Graphics N.V.).

In a more preferred embodiment, the aminobenzoate co-initiators are oligomeric aminobenzoate derivatives.

Particularly preferred aminobenzoates are polyether derivatives of aminobenzoates, wherein the polyether is selected from the group consisting of poly(ethylene oxide), poly(propylene oxide), copolymers thereof, and poly(tetrahydrofuran), ethoxylated or propoxylated neopentyl glycol, ethoxylated or propoxylated trimethylpropane and ethoxylated or propoxylated pentaerythritol.

Preferred oligomeric aminobenzoates are disclosed in WO1996/33157 (Lambson Fine Chemicals Ltd.) and WO2011/030089 (Sun Chemicals B.V.). Typical examples of polyethylene glycol bis p-dimethylaminobenzoate are OMNIPOL ASA, commercially available from IGM Resins and Speedcure 7040, commercially available from Lambson Fine Chemicals.

Other oligomeric or polymeric co-initiators are for example ESACURE A198, a polyfunctional amine from IGM and SARTOMER® CN3755, an acrylated amine co-initiator from ARKEMA.

Polymerizable Compounds

The polymerizable compounds are preferably free radical polymerizable compounds.

The free radical polymerizable compounds may be monomers, oligomers and/or prepolymers. Monomers are also referred to as diluents.

These monomers, oligomers and/or prepolymers may possess different degrees of functionality, i.e. a different amount of free radical polymerizable groups.

A mixture including combinations of mono-, di-, tri- and higher functional monomers, oligomers and/or prepolymers may be used. The viscosity of the radiation curable inkjet ink may be adjusted by varying the ratio between the monomers and oligomers.

In a preferred embodiment, the monomer, oligomer or prepolymer includes at least one acrylate group as polymerizable group.

Preferred monomers and oligomers are those listed in paragraphs [0106] to [0115] in EP-A 1911814.

In a preferred embodiment, the radiation curable inkjet ink comprises a monomer containing a vinyl ether group and an acrylate or methacrylate group. Such monomers are disclosed in EP-A 2848659, paragraphs [0099] to [0104]). A particular preferred monomer containing a vinyl ether group and an acrylate group is 2-(2-vinyloxyethoxy)ethyl acrylate.

The polymerizable compound is preferably selected from the group consisting of 2-phenoxyethyl acrylate, acryloyl morpholine, cyclic trimethylol propane formal acrylate, isobornyl acrylate, lauryl acrylate, dipropylene glycol diacrylate, trimethylol propane triacrylate, 2-(vinylethoxy) ethyl acrylate, 3,3,5-trimethylcyclohexyl acrylate and urethane acrylate. Particularly preferred polymerizable compounds are 2-(vinyl-ethoxy)ethyl acrylate and 2-phenoxyethyl acrylate.

Adhesion Promoter

The radiation curable inkjet ink may include an adhesion promoter to further optimize the adhesion of the cured composition to various surfaces, in particular a copper surface.

Any adhesion promoter may be used, for example those disclosed in WO2004/026977 and WO2004/105 both from AVECIA; WO2017/009097 and WO2020/104302 both from Agfa Gevaert; and WO2018/087059, WO2018087052 WO2018087056 and WO2018087055, all from Agfa Gevaert/Electra Polymers.

The radiation curable inkjet ink may include one adhesion promoter or a combination of two, three or more different adhesion promoters.

The total amount of adhesion promoters is preferably between 0.1 and 20 wt %, more preferably between 0.5 and 15 wt %, most preferably between 1 and 10 wt %, all relative to the total weight of the inkjet ink.

However, it has been observed that an inkjet ink according to the present invention may have a sufficient adhesion, even after soldering, gold or ENIG plating, in the absence of an adhesion promoter. As the presence of adhesion promoters may result in a worse stability of the inkjet ink, the radiation curable inkjet ink according to the present invention preferably does not contain an adhesion promoter.

Colorants

The radiation curable inkjet may be a substantially colourless inkjet ink or may include at least one colorant. For example when the inkjet ink is used as etch resist, the colorant makes the temporary mask clearly visible to the manufacturer of conductive patterns, allowing a visual inspection of quality. When the inkjet ink is used to apply a solder mask it typically contains a colorant. A preferred colour for a solder mask is green, however other colours such as black or red may also be used.

The colorant may be a pigment or a dye.

A colour pigment may be chosen from those disclosed by HERBST, Willy, et al. Industrial Organic Pigments, Production, Properties, Applications. 3rd edition. Wiley—VCH, 2004. ISBN 3527305769. Suitable pigments are disclosed in paragraphs [0128] to [0138] of WO2008/074548.

Pigment particles in inkjet inks should be sufficiently small to permit free flow of the ink through the inkjet-printing device, especially at the ejecting nozzles. It is also desirable to use small particles for maximum colour strength and to slow down sedimentation. Most preferably, the average pigment particle size is no larger than 150 nm. The average particle size of pigment particles is preferably determined with a Brookhaven Instruments Particle Sizer BI90plus based upon the principle of dynamic light scattering.

Generally dyes exhibit a higher light fading than pigments, but cause no problems on jettability. It was found that anthraquinone dyes exhibit only minor light fading under the normal UV curing conditions used in UV curable inkjet printing. In a preferred embodiment, the colorant in the radiation curable inkjet ink is an anthraquinone dye, such as Macrolex™ Blue 3R (CASRN 325781-98-4) from LANXESS.

Other preferred dyes include crystal violet and a copper phthalocyanine dye.

In a preferred embodiment, the colorant is present in an amount of 0.5 to 6.0 wt %, more preferably 1.0 to 2.5 wt %, based on the total weight of the radiation curable inkjet ink.

Polymeric Dispersants

If the colorant in the radiation curable inkjet is a pigment, then the radiation curable inkjet preferably contains a dispersant, more preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:
- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable polymeric dispersants are listed in the section on "Dispersants", more specifically [0064] to [0070] and [0074] to [0077], in EP-A 1911814.

Commercial examples of polymeric dispersants are the following:
- DISPERBYK™ dispersants available from BYK CHEMIE GMBH;
- SOLSPERSE™ dispersants available from NOVEON;
- TEGO™ DISPERS™ dispersants from EVONIK;
- EDAPLAN™ dispersants from MÜNZING CHEMIE;
- ETHACRYL™ dispersants from LYONDELL;
- GANEX™ dispersants from ISP;
- DISPEX™ and EFKA™ dispersants from CIBA SPECIALTY CHEMICALS INC;
- DISPONER™ dispersants from DEUCHEM; and
- JONCRYL™ dispersants from JOHNSON POLYMER.

Polymerization Inhibitors

The radiation curable inkjet ink may contain at least one inhibitor for improving the thermal stability of the ink.

Suitable polymerization inhibitors include phenol type antioxidants, hindered amine light stabilizers, phosphor type antioxidants, hydroquinone monomethyl ether commonly used in (meth)acrylate monomers, and hydroquinone, t-butyl-catechol, pyrogallol, 2,6-di-tert.butyl-4-methylphenol (=BHT) may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors may lower the curing speed, it is preferred that the amount capable of preventing polymerization is determined prior to blending. The amount of a polymerization inhibitor is preferably lower than 5 wt %, more preferably lower than 3 wt % of the total radiation curable inkjet ink.

Surfactants

The radiation curable inkjet ink may contain at least one surfactant.

The surfactant can be anionic, cationic, non-ionic, or zwitter-ionic and is usually added in a total quantity less than 1 wt % based on the total weight of the radiation curable inkjet ink.

Suitable surfactants include fluorinated surfactants, fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoric surfactants (such as fluorinated hydrocarbons) and silicone surfactants. The silicone surfactants are preferably siloxanes and can be alkoxylated, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferably the surfactant is present in the radiation curable inkjet ink in an amount of 0 to 3 wt % based on the total weight of the radiation curable inkjet ink.

Flame Retardant

The radiation curable inkjet ink preferably comprises a flame retardant.

Preferred flame retardants are inorganic flame retardants, such as Alumina Trihydrate and Boehmite, and organophosphor compounds, such as organo-phosphates (e.g. triphenyl phosphate (TPP), resorcinol bis (diphenylphosphate) (RDP), bisphenol A diphenyl phosphate (BADP), and tricresyl phosphate (TCP)); organo-phosphonates (e.g. dimethyl methylphosphonate (DMMP)); and organophosphinates (e.g. aluminium dimethylphosphinate).

Preferred flame retardants are disclosed in WO2019/121098.

Preparation of Inkjet Inks

The preparation of pigmented radiation curable inkjet inks is well-known to the skilled person. Preferred methods of preparation are disclosed in paragraphs [0076] to [0085] of WO2011/069943.

Method of Manufacturing an Electronic Device.

The method of manufacturing an electronic device according to the present invention includes at least one inkjet printing step wherein a radiation curable inkjet ink as described above is jetted and cured on a substrate.

According to a preferred embodiment, the electronic device is a Printed Circuit Board (PCB).

According to a particular preferred embodiment, the method of manufacturing a PCB includes an inkjet printing step wherein a solder mask is provided.

The solder mask is provided by jetting and curing the radiation curable inkjet ink typically on the substrate, for example a dielectric substrate containing an electrically conductive pattern.

A heat treatment is preferably applied to the jetted and cured radiation curable inkjet ink. The heat treatment is preferably carried out at a temperature between 80° C. and 250° C. The temperature is preferably not less than 100° C., more preferably not less than 120° C. To prevent charring of the solder mask, the temperature is preferably not higher than 200° C., more preferably not higher than 160° C.

The thermal treatment is typically carried out between 15 and 90 minutes.

The purpose of the thermal treatment is to further increase the polymerization degree of the solder mask.

The dielectric substrate of the electronic device may be any non-conductive material. The substrate is typically a paper/resin composite or a resin/fibre glass composite, a ceramic substrate, a polyester or a polyimide.

The electrically conductive pattern is typically made from any metal or alloy which is conventionally used for preparing electronic devices such as gold, silver, palladium, nickel/gold, nickel, tin, tin/lead, aluminium, tin/aluminium and copper. The electrically conductive pattern is preferably made from copper.

The radiation curable inkjet ink may be cured by exposing the ink to actinic radiation, such as electron beam or ultraviolet (UV) radiation. Preferably the radiation curable inkjet ink is cured by UV radiation, more preferably using UV LED curing.

The method of manufacturing a PCB may comprise two, three or more inkjet printing steps. For example the method may comprise two inkjet printing steps wherein an etch resist is provided on a metal surface in one inkjet printing step and wherein a solder mask is provided on a dielectric substrate containing an electrically conductive pattern in another inkjet printing step.

A third inkjet printing step may be used for legend printing.

Inkjet Printing Devices

The radiation curable inkjet ink may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type.

The inkjet print head normally scans back and forth in a transversal direction across the moving ink-receiving surface (substrate). Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiving surface. In a single pass printing process the inkjet print heads usually remain stationary and the ink-receiving surface is transported under the inkjet print heads.

Curing Devices

The radiation curable inkjet ink can be cured by exposing them to actinic radiation, such as electron beam or ultraviolet radiation. Preferably the radiation curable inkjet ink is cured by ultraviolet radiation, more preferably using UV LED curing.

In inkjet printing, the curing means may be arranged in combination with the print head of the inkjet printer, travelling therewith so that the curable liquid is exposed to curing radiation very shortly after been jetted.

In such an arrangement, with the exception of UV LEDs, it can be difficult to provide a small enough radiation source connected to and travelling with the print head.

Therefore, a static fixed radiation source may be employed, e.g. a source of curing UV-light, connected to the radiation source by means of flexible radiation conductive means such as a fibre optic bundle or an internally reflective flexible tube.

Alternatively, the actinic radiation may be supplied from a fixed source to the radiation head by an arrangement of mirrors including a mirror upon the radiation head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

In a preferred embodiment, the radiation curable inkjet ink is cured by UV LEDs. The inkjet printing device preferably contains one or more UV LEDs preferably with a wavelength larger than 360 nm, preferably one or more UV LEDs with a wavelength larger than 380 nm, and most preferably UV LEDs with a wavelength of about 395 nm.

Furthermore, it is possible to cure the ink image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the following examples were readily available from standard sources such as ALDRICH CHEMICAL Co. (Belgium) and ACROS (Belgium) unless otherwise specified. The water used was deionized water.

VEEA is 2-(vinylethoxy)ethyl acrylate available from NIPPON SHOKUBAI, Japan.

PEA is 2-phenoxyethyl acrylate available as Sartomer™ SR339 from ARKEMA.

EDIOXMA is a mixture of cyclic trimethylolpropane formal acrylate and trimethylolpropane triacrylate available as Photomer 4141 from IGM Resins.

ISOPA is 3,3,5-trimethylcyclohexyl acrylate available as Sartomer™ SR420 from ARKEMA.

ACMO is acryloyl morpholine available from RAHN.

SR335 is a lauryl acrylate available as Sartomer™ SR335 from ARKEMA.

TMPTA is trimethylolpropane triacrylate available as Sartomer™ SR351 from ARKEMA.

AA is acrylic acid available from ALDRICH.

EPD is aminobenzoate available as Genocure EPD from RAHN.

DAROCUR ITX is an isomeric mixture of 2- and 4-isopropylthioxanthone from BASF.

PB5 is a branched poly(4-hydroxystyrene) available as PB5 from HYDRITE CHEMICAL COMPANY.

BAPO is a bis(2,4,6-trimethylbenzoyl)-phenylphosphineoxide photoinitiator available as Irgacure™ 819 from BASF.

Omnipol ASA is a polymeric amine synergist available from IGM Resins.

FR-1 is ADK STAB FP-600, a high molecular weight, liquid phosphate ester available from ADEKA.

Novolac-1 is Durite™ Resin D_126A, a cresol formaldehyde novolac resin from HEXION.

Novolac-2 is AV Lite Resin SP1006N, a novolac resin from SIBER HEGNER.

Trixene B17960 is a blocked HDI biuret from BAXENDEN Chemicals.

Laroctat 150 is a triazine thermal cross-linking agent from BASF.

INHIB is a mixture forming a polymerization inhibitor having a composition according to Table 1.

TABLE 1

| Component | wt % |
|---|---|
| DPGDA | 82.4 |
| p-methoxyphenol | 4.0 |
| 2,6-di-tert-butyl-4-methylphenol | 10.0 |
| Cupferron ™ AL | 3.6 |

Cupferron™ AL is aluminum N-nitrosophenylhydroxylamine from WAKO CHEMICALS LTD.

DPGDA is dipropylenediacrylate, available as Sartomer SR508 from ARKEMA.

Ebecryl 1360 is a polysiloxane hexa-acrylate slip agent from ALLNEX.

Cyan is SUN FAST BLUE 15:4, a cyan pigment available from SUN CHEMICALS.

Yellow is CROMOPHTAL YELLOW D 1085J, a yellow pigment from BASF.

Disperbyk 162 is a dispersing agent and has been precipitated from a solution available from BYK (ALTANA).

Methods

Viscosity

The viscosity of the inks was measured at 45° C. and at a shear rate of 1000 $s^{-1}$ using a "Robotic Viscometer Type VISCObot" from CAMBRIDGE APPLIED SYSTEMS.

For industrial inkjet printing, the viscosity at 45° C. and at a shear rate of 1000 $s^{-1}$ is preferably between 5.0 and 15 mPa·s. More preferably the viscosity at 45° C. and at a shear rate of 1 000 $s^{-1}$ is less than 15 mPa·s.

Adhesion of the Inkjet Inks

The adhesion was evaluated with a Tesatape™ 4104 PVC tape. The evaluation was made in accordance with a criterion described in Table 2.

TABLE 2

| Evaluation value | Criterion |
|---|---|
| 0 | Nothing removed, perfect adhesion. |
| 1 | Detachment of only very small parts of the cured layer, almost perfect adhesion. |
| 2 | Minor parts of the cured layer was removed by the tape, good adhesion |
| 3 | Parts of the cured layer were removed by the tape, poor adhesion. |
| 4 | Most of the cured layer was removed by the tape, poor adhesion. |
| 5 | The cured layer was completely removed from the substrate by the tape, no adhesion. |

Solder Resistance

The solder resistance of the inkjet inks was evaluated using a SPL600240 Digital Dynamic Solder Pot available from L&M PRODUCTS filled with a "K" Grade 63:37 tin/lead solder available from SOLDER CONNECTION. The temperature of the solder was set at 290° C.

Using a Q-tip, a solder flux SC7560A from SOLDER CONNECTION was applied on the surface of the samples (i.e. coatings of the inkjet ink on a copper surface as described under adhesion) to clean the surface. The solder flux was dried by placing the samples for 10 minutes above the solder pot.

The sample was put in the solder pot for 10 seconds. This was reproduced 3 times in total after which the samples were cooled for at least 10 minutes.

The adhesion of the inkjet inks after solder dip test was evaluated after the printed samples were cooled down at room temperature. Then they were evaluated by visual observation of peeling off/delamination. Samples were ok if no peel off/adhesion loss was observed.

If solder was observed on top of a printed layer, this was definite sign of a failed solder dip test (solder mask was peeled off and solder could attach to copper beneath it).

ENIG Resistance

An ENIG simulation as described below was carried out:
The boards were dipped in a bath of acid cleaner (Umicore cleaner 865) at 40° C. during 4 min. The boards were then removed and dipped in a rinsing bath of deionized water (DW) at room temperature (RT) during 90 seconds.

The boards were dipped in a microetching bath comprising 8.5 wt % $Na_2S_2O_8$ and ±3.2 wt % $H_2SO_4$ (98%) in water at a temperature between 26-33° C. for 100 s. The boards were then removed and rinsed in respectively DW, a 2.5 wt % aqueous $H_2SO_4$ solution and DW, all at RT during 90 seconds.

The boards were dipped in a palladium activator bath (Accemulta MKN 4) at a temperature around 30° C. for 90 s followed by dipping in a 5 wt % aqueous $H_2SO_4$ solution at RT during 75 seconds. The boards were then removed and dipped in a rinsing bath of DW at RT during 90 seconds.

Then the boards were dipped in a nickel bath (Nimuden NPR 4) at a temperature around 85° C. for 35 min. The boards were then removed and dipped in a rinsing bath of DW at RT during 90 s.

Finally, the boards were dipped in a gold bath (Gobright TAM 55) at a temperature around 80° C. for 12 min. The boards were then removed and dipped in a rinsing bath of DW at RT during 90 s.

After ENIG treatment it is possible that so-called blistering occurs, especially around open pads. In these areas, it appears that the ENIG solution penetrates and lift up the solder mask layer. This phenomenon creates weak adhesion points of the solder mask onto the substrate and may results in peeling off of the layer.

The occurrence of blisters was evaluated visually as follows:
0: Perfect ENIG resistance. No blistering nor halo effect.
1: Very limited amount of blisters on some areas but no halo effect.
2: Small amount of blisters around the open pad. No halo effect.
3: Small amount of blisters around the open pad and halo effect.
4: Blisters present around open pad and on the full areas. Big halo effect around copper pad.
5: Blisters all around the board resulting in complete loss of adhesion.

Example 1

This example illustrates that an UV curable inkjet ink according to the present invention may be used as a solder mask inkjet ink combining a good adhesion towards copper and a sufficient solder and ENIG resistance.

Preparation of Green Dispersion GD

A concentrated green dispersion, GD, was prepared having a composition according to Table 3.

TABLE 3

| GD | wt % |
|---|---|
| Cyan | 7.5 |
| Yellow | 7.5 |
| Disperbyk 162 | 15 |
| INHIB | 1 |
| VEEA | 69 |

GD was prepared as follows: 138 g of 2-(2-vinyloxyethoxy)ethyl acrylate, 2 g of a solution containing 4 wt % of 4-methoxyphenol, 10 wt % of 2,6-di-tert-butyl-4-methylphenol and 3.6 wt % of Aluminum-N-nitroso phenylhydroxyl amine in dipropylene glycol diacrylate and 30 g of Cyan and 30 g of Yellow were mixed using a DISPERLUX™ dispenser. Stirring was continued for 30 minutes. The vessel was connected to a NETZCH MiniZeta mill filled with 900 g of 0.4 mm yttrium stabilized zirconia beads ("high wear resistant zirconia grinding media" from TOSOH Co.). The mixture was circulated over the mill over 120 minutes (residence time of 45 minutes) and a rotation speed in the mill of about 10.4 m/s. During the complete milling procedure the content in the mill was cooled to keep the temperature below 60° C. After milling, the dispersion was discharged into a vessel.

Preparation of Comparative Inks COMP-1 to COMP-5 and Inventive Inks INV-1 to INV-3

The comparative radiation curable inkjet ink COMP-1 to COMP-5 and the inventive radiation curable inkjet inks INV-1 to INV-3 were prepared according to Table 4. The weight percentages (wt %) are all based on the total weight of the radiation curable Table 4

TABLE 4

| wt % of component | COMP-1 | INV-1 | INV-2 | COMP-2 |
|---|---|---|---|---|
| GD | 6.6 | = | = | = |
| VEEA | 24.20 | 22.17 | 23.37 | 22.17 |
| PEA | — | 48.41 | = | = |
| ACMO | 5.00 | — | — | — |
| SR335 | 5.00 | — | — | — |
| EDIOXMA | 20.00 | — | — | — |
| SR420 | 15.00 | — | — | — |
| TMPTA | 5.00 | — | — | — |
| DAROCUR ITX | 4.00 | 0.60 | = | = |
| BAPO | 2.00 | 4.70 | = | = |
| EPD | 4.00 | — | — | — |
| OMNIPOL ASA | — | 6.00 | = | = |
| AA | 1.20 | — | — | — |
| FR-1 | 2.00 | = | = | = |
| PB5 | 5.00 | 5.00 | 5.00 | — |
| NOVOLAC-1 | — | — | — | 5.00 |
| NOVOLAC-2 | — | — | — | — |
| TRIXENE BI7960 | — | 1.20 | — | 1.20 |
| LAROCTAT 150 | — | 2.40 | = | = |
| EBECRYL 1360 | 0.1 | 0.02 | = | = |
| INHIB | 0.90 | = | = | = |

| wt % of component | COMP-3 | INV-3 | INV-4 | COMP-5 |
|---|---|---|---|---|
| GD | 6.6 | = | = | = |
| VEEA | 22.17 | 24.17 | = | = |
| PEA | 48.41 | = | = | = |
| DAROCUR ITX | 0.60 | = | = | = |
| BAPO | 4.70 | = | = | = |
| OMNIPOL ASA | 6.00 | = | = | = |
| FR-1 | 2.00 | = | = | = |
| PB5 | — | 3.00 | — | — |

TABLE 4-continued

| | | | | |
|---|---|---|---|---|
| NOVOLAC-1 | — | — | 3.00 | — |
| NOVOLAC-2 | 5.00 | — | — | 3.00 |
| TRIXENE BI7960 | 1.20 | = | = | = |
| LAROCTAT 150 | 2.40 | = | = | = |
| EBECRYL 1360 | 0.02 | = | = | = |
| INHIB | 0.9 | = | = | = |

The inkjet inks were printed using a Craftpix CPS (Printhead Konica Minolta KM1024iS, UV LED 395 12 W total output of the lamp) on a Copper Clad Laminate (CCL) to obtain a soldermask layer having a final thickness of +/−22 μm. The CCL includes a 35 μm copper foil that was roughened by chemical etching. In the chemical etching step the copper foil was transported through a Bungard Sprint 3000 Conveyorized Spray Etch machine at a speed of 0.4 m/min while spraying with the chemical etchant CZ2001 (available from MEC) heated at 30° C. After a rinsing step with demineralized water an extra spraying step with 1 M HCL was carried out, followed again by a rinsing step with demineralized water. The copper foil was dried in an Air 2000 dryer (available from Bungard). The copper substrate was printed within 24 h after this pretreatment.

After printing the samples were baked in an oven at 150° C. for 1 hour.

Different printing protocols have been used:

Print-1: An image having a resolution 1440 dpi in the x-direction and 1440 dpi in the y-direction was printed and cured. The UV energy applied corresponded to 10% of the total power of the 12 W lamp. A final cure was applied to further cure the printed solder mask layer (4 passes at full energy of the 12 W lamp).

Print-2: Compared to Print 1, the image was printed and cured in two passes to achieve a certain thickness and the UV energy applied corresponded to 100% of the total power of the 12 W lamp. A final cure was then carried out as described for Print-1.

The Solder resistance of the inks were tested as described above. The results are shown in Table 5.

TABLE 5

| UV curable ink jet ink | Adhesion | | Adhesion after solder dip | |
|---|---|---|---|---|
| | Print 1 | Print 2 | Print 1 | Print 2 |
| COMP-1 | 1 | 0 | OK | OK |
| INV-1 | 0 | 0 | OK | OK |
| INV-2 | 1 | 0 | OK | OK |
| COMP-2 | 1 | 1 | OK | NOK |
| COMP-3 | 0 | 0 | NOK | OK |
| INV-3 | 2 | 0 | OK | OK |
| COMP-4 | 4 | 0 | NOK | OK |
| COMP-5 | 0 | 0 | NOK | OK |

It is clear from the results of Table 5 that the inventive inkjet inks including a phenolic resin according to the present invention have a better solder resistance compared to those inks including a novolac resin (COMP-2 to COMP-5).

Table 6 shows the ENIG resistance of the inkjet inks COMP-1 and INV-1 printed with the printing protocol Print-1 described above.

TABLE 6

| UV curable ink jet ink | ENIG Resistance |
|---|---|
| COMP-1 | 4 |
| INV-1 | 1 |

It is clear from the results of Table 6 that the ENIG resistance of the inkjet ink without a thermal cross-linking agent is not sufficient (occurrence of blistering).

Example 2

This example illustrates that an UV curable inkjet ink according to the present invention may be used as a solder mask inkjet ink combining a good adhesion towards copper and a sufficient solder and ENIG resistance.

Preparation of Comparative Inks COMP-6 and Inventive Inks INV-4

The comparative radiation curable inkjet ink COMP-6 and the inventive radiation curable inkjet ink INV-4 were prepared according to Table 7. The weight percentages (wt %) are all based on the total weight of the radiation curable inkjet ink.

TABLE 7

| wt % of component | COMP-6 | INV-4 |
|---|---|---|
| GD | 6.6 | = |
| VEEA | 24.76 | 23.48 |
| PEA | 48.72 | 40.00 |
| DAROCUR ITX | 4.0 | = |
| BAPO | 2.00 | = |
| OMNIPOL ASA | 6.00 | = |
| PB5 | 5.00 | = |
| TRIXENE BI7960 | — | 10.00 |
| BISAPHOS | 2.00 | 2.00 |
| EBECRYL 1360 | 0.02 | = |
| INHIB | 0.90 | = |

The inkjet inks were printed as in example 1.

The ENIG resistance was evaluated as described above using the print protocol Print-1 described above. The results are shown in Table 8.

TABLE 8

| UV curable ink jet ink | ENIG Resistance |
|---|---|
| COMP-6 | 4 |
| INV-4 | 1 |

It is clear from Table 8 that the addition of a thermal cross-linking agent to the radiation curable inkjet ink results in an improved ENIG resistance (less blistering).

The invention claimed is:

1. A radiation curable inkjet ink comprising a polymerizable compound, a phenolic resin, and a thermal cross-linking agent, characterized in that the phenolic resin includes at least one structural moiety of Formula I,

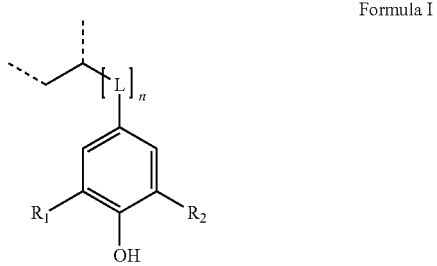

Formula I wherein
L represents a divalent linking group having no more than 10 carbon atoms;
n represents 0 or 1;
$R_1$ and $R_2$ each independently represent a group selected from hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, a substituted or unsubstituted (hetero) aryl group, and a substituted or unsubstituted alkoxy group, and
wherein the thermal cross-linking agent comprises (a) an isocyanate compound or (b) a combination of an isocyanate compound and a triazine compound.

2. The radiation curable inkjet ink of claim 1, wherein the phenolic resin includes at least one structural moiety of Formula II,

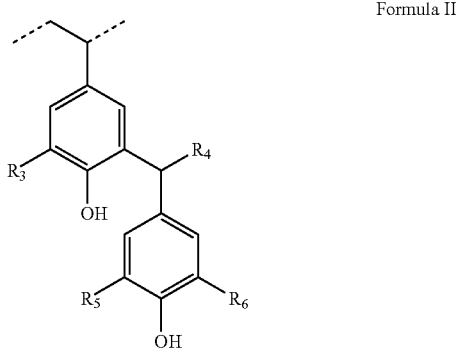

Formula II wherein
$R_3$, $R_5$, and $R_6$ each independently represent a group selected from hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, a substituted or unsubstituted (hetero) aryl group, and a substituted or unsubstituted alkoxy group;
$R_4$ represents a group selected from hydrogen, an alkyl group, and an aryl group.

3. The radiation curable inkjet ink of claim 2, wherein at least one of $R_3$, $R_5$, and $R_6$ includes a substituent comprising a phenolic group.

4. The radiation curable inkjet ink of claim 2, wherein $R_4$ is hydrogen or a $C_1$ to $C_6$ alkyl group.

5. The radiation curable inkjet ink of claim 1, wherein the isocyanate compound is a blocked isocyanate compound.

6. The radiation curable inkjet ink of claim 1, wherein the cross-linking agent comprises a combination of an isocyanate compound and a triazine compound and the triazine compound is of Formula III,

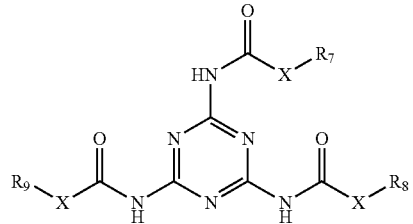

Formula III wherein
X represents N, O, S, P, or C;
$R_7$, $R_8$, and $R_9$ each independently represent a substituted or unsubstituted alkyl group.

7. The radiation curable inkjet ink of claim 1, wherein the total amount of thermal cross-linking agent is from 0.1 to 10 wt %, relative to the total weight of the inkjet ink.

8. The radiation curable inkjet ink of claim 1, wherein the amount of the phenolic resin is from 2.5 to 10 wt %, relative to the total weight of the inkjet ink.

9. The radiation curable inkjet ink of claim 1, wherein the polymerizable compound is selected from 2-phenoxyethyl acrylate, acryloyl morpholine, cyclic trimethylol propane formal acrylate, isobornyl acrylate, lauryl acrylate, dipropylene glycol diacrylate, trimethylol propane triacrylate, 2-(vinylethoxy) ethyl acrylate, 3,3,5-trimethylcyclohexyl acrylate, and urethane acrylate.

10. A method of manufacturing an electronic device including an inkjet printing step wherein a radiation curable inkjet ink as defined in claim 1, is jetted and cured on a substrate.

11. The method of claim 10, wherein curing is carried out using LED UV radiation.

12. The method of claim 10, further comprising a heating step.

13. The method of claim 12, wherein the heating step is carried out at a temperature from 80° C. to 250° C.

14. The method of claim 10, wherein the substrate is a dielectric substrate provided with an electrically conductive circuitry.

* * * * *